(12) United States Patent
Sundaraaman

(10) Patent No.: US 10,658,852 B2
(45) Date of Patent: May 19, 2020

(54) BATTERY PACK AND PROTECTION METHOD OF THE BATTERY PACK

(71) Applicant: Samsung SDI Co., Ltd., Yongin-si, Gyeonggi-do (KR)

(72) Inventor: K. V. Sundaraaman, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 42 days.

(21) Appl. No.: 15/853,009

(22) Filed: Dec. 22, 2017

(65) Prior Publication Data

US 2018/0191177 A1 Jul. 5, 2018

(30) Foreign Application Priority Data

Jan. 5, 2017 (KR) .................. 10-2017-0002061

(51) Int. Cl.
*H02J 7/00* (2006.01)
*H01M 10/42* (2006.01)
*H01M 10/44* (2006.01)
*H01M 10/48* (2006.01)
(Continued)

(52) U.S. Cl.
CPC ........... *H02J 7/0026* (2013.01); *H01M 2/348* (2013.01); *H01M 10/425* (2013.01); *H01M 10/441* (2013.01); *H01M 10/482* (2013.01); *H01M 10/486* (2013.01); *H02J 7/0016* (2013.01); *H02J 7/0019* (2013.01); *H02J 7/0021* (2013.01); *H02J 7/0047* (2013.01); *H02J 7/0068* (2013.01); *H01M 2/1022* (2013.01); *H01M 2010/4271* (2013.01); *H01M 2200/103* (2013.01); *H01M 2220/30* (2013.01); *H02J 7/0029* (2013.01); *H02J 2007/0037* (2013.01); *H02J 2007/0039* (2013.01)

(58) Field of Classification Search
CPC ....................................................... H02J 7/0026
USPC ............................................................ 320/118
See application file for complete search history.

(56) References Cited

U.S. PATENT DOCUMENTS 8,134,340 B2 3/2012 Park
8,704,488 B2 4/2014 Yun et al.
(Continued)

FOREIGN PATENT DOCUMENTS

JP 2005-85392 A 3/2005
KR 10-2011-0021397 3/2011
(Continued)

OTHER PUBLICATIONS

KIPO Office Action dated Aug. 17, 2017, for KR 10-2017-0002061, 35 pages.
(Continued)

*Primary Examiner* — Yalkew Fantu
(74) *Attorney, Agent, or Firm* — Lewis Roca Rothgerber Christie LLP

(57) ABSTRACT

A battery pack and a protection method of the battery pack are provided. The battery pack includes a battery including battery cells, a balancing unit for balancing voltages between the battery cells, a first switch on a high-current path of the battery, and a battery management unit for monitoring a voltage, a temperature, and a current of the battery, for applying a control signal for turning off the first switch, and for operating the balancing unit when the first switch is not turned off in response to the control signal.

13 Claims, 2 Drawing Sheets

(51) Int. Cl.
*H01M 2/34* (2006.01)
*H01M 2/10* (2006.01)

(56) References Cited

U.S. PATENT DOCUMENTS

| | | | | |
|---|---|---|---|---|
| 8,963,499 | B2* | 2/2015 | Choi | H02J 7/0026 |
| | | | | 320/116 |
| 9,054,538 | B2 | 6/2015 | Kim | |
| 9,325,178 | B2 | 4/2016 | Yun et al. | |
| 2003/0160593 | A1* | 8/2003 | Yau | H02J 7/0018 |
| | | | | 320/116 |
| 2005/0083797 | A1 | 4/2005 | Shigeeda et al. | |
| 2005/0127873 | A1* | 6/2005 | Yamamoto | H02J 7/0016 |
| | | | | 320/116 |
| 2005/0242775 | A1* | 11/2005 | Miyazaki | B60L 50/64 |
| | | | | 320/116 |
| 2013/0057290 | A1* | 3/2013 | Hong | H01M 10/48 |
| | | | | 324/427 |
| 2014/0079960 | A1* | 3/2014 | Yun | H02J 7/34 |
| | | | | 429/7 |
| 2017/0279283 | A1 | 9/2017 | Kim et al. | |

FOREIGN PATENT DOCUMENTS

| | | |
|---|---|---|
| KR | 10-2012-0013775 A | 2/2012 |
| KR | 10-2012-0059247 | 6/2012 |
| KR | 10-2014-0029800 | 3/2014 |
| KR | 10-2014-0106982 | 9/2014 |
| KR | 10-1667913 | 10/2016 |

OTHER PUBLICATIONS

Korean Notice of Allowance dated Nov. 7, 2018, for corresponding Korean Patent Application No. 10-2018-0032125 (6 pages).

* cited by examiner

BATTERY PACK AND PROTECTION METHOD OF THE BATTERY PACK

CROSS-REFERENCE TO RELATED APPLICATION

This application claims priority to, and the benefit of, Korean Patent Application No. 10-2017-0002061, filed on Jan. 5, 2017, in the Korean Intellectual Property Office, the disclosure of which is incorporated herein in its entirety by reference.

BACKGROUND

1. Field

One or more embodiments relate to a battery pack, and to a protection method of the battery pack.

2. Description of the Related Art

Along with wide use of portable devices, such as mobile phones, digital cameras, laptop computers, and the like, development of batteries for supplying power to operate such portable electronic devices has been actively conducted. Such a battery is provided as a battery pack including a protection circuit for controlling charging and discharging of the battery. There also has been research into various aspects of a method and device for efficiently charging the battery.

A battery pack may include a charging switch and a discharging switch, which may be respectively turned off to protect a battery from being overcharged or overdischarged. However, when the charging switch or the discharging switch does not properly operate even when being turned on to protect the battery, the battery may be overcharged, with rapidly increasing internal temperature thereof, causing a thermal runaway with a risk of damage, combustion/ignition, or explosion.

SUMMARY

According to one or more embodiments, a battery pack includes a battery including battery cells, a balancing unit for balancing voltages between the battery cells, a first switch on a high-current path of the battery, and a battery management unit for monitoring a voltage, a temperature, and a current of the battery, for applying a control signal for turning off the first switch, and for operating the balancing unit when the first switch is not turned off in response to the control signal.

The battery pack may further include a protection unit on the high-current path of the battery for blocking the high-current path when the temperature of the battery exceeds a first threshold value.

The protection unit may be for blocking the high-current path after operation of the balancing unit.

The protection unit may include at least one of a fuse that is blown out when the temperature reaches the first threshold value, and a self-control protector (SCP).

The battery management unit may be for operating the balancing unit when the battery is in an overcharging state.

The balancing unit may be for balancing a voltage by self-discharging of the battery cells.

The battery pack may further include an alert unit for generating an alarm signal when the balancing unit operates as the first switch is not turned off in response to the control signal.

According to one or more embodiments, a method of protecting a battery pack includes sensing at least one of an overcharging or an overcurrent of a battery of the battery back, outputting a control signal for turning off a first switch on a high-current path of the battery, and operating a balancing unit for balancing a voltage of at least one battery cell of the battery when the first switch is not turned off in response to the control signal.

The method may further include operating a protection unit to block the high-current path when a temperature of the battery exceeds a first threshold value due to an overcharge or an overcurrent of the battery.

The protection unit may include at least one of a fuse that is blown out when the temperature reaches the first threshold value, and a self-control protector (SCP).

The method may further include generating an alarm signal after the balancing unit is operated as the first switch is not turned off in response to the control signal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
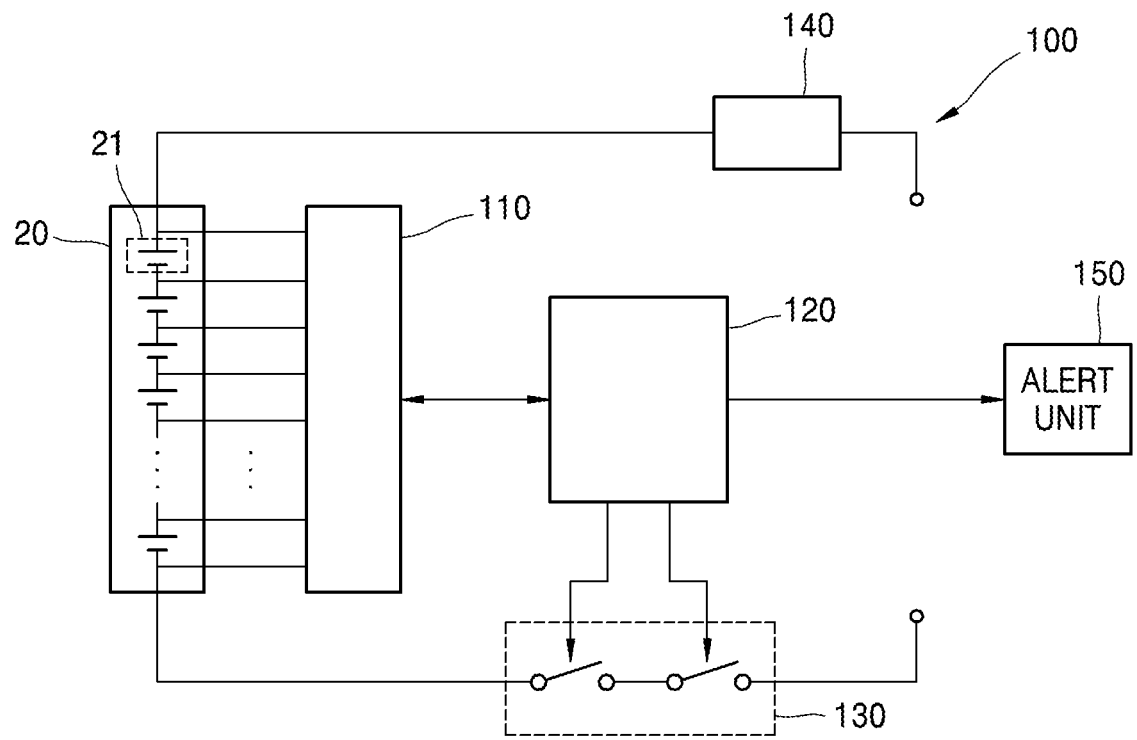
FIG. 1 is a schematic diagram illustrating an inner structure of a battery pack according to an embodiment.

Features of the inventive concept and methods of accomplishing the same may be understood more readily by reference to the following detailed description of embodiments and the accompanying drawings. Hereinafter, embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic diagram illustrating an inner structure of a battery pack 10 according to an embodiment.

Referring to FIG. 1, the battery pack 100 according to an embodiment may include a battery 20, a battery management unit 120, a first switch 130, a protection unit 140, an alert unit 150, and a balancing unit 110.

The battery 20, as a part for storing power, may include at least one battery cell 21. For example, the battery 20 may include one battery cell 21 or a plurality of battery cells 21. The battery cells 21 may be connected to one another in series, in parallel, or in a combination of a series and parallel connection. The number of battery cells 21 in the battery 20 and a connection pattern thereof may be determined depending on a suitable output voltage and power storage capacity.

The battery cell 21 may include a rechargeable secondary battery. For example, the battery cell 21 may be a nickel-cadmium battery, a nickel metal hydride (NIMH) battery, a lithium ion battery, or a lithium polymer battery.

The first switch 130 may be arranged on a high-current path of the battery 20, and may control flow of a charging current and a discharging current of the battery. The first switch 130 may be turned on/off according to a control signal of the battery management unit 120. The first switch 130 may include a relay or a field-effect transistor (FET) switch.

The first switch 130 may include a charging switch that blocks off a charging current, and a discharging switch that blocks off a discharging current. The charging switch may include a charging FET switch and a first diode. In the first diode, a discharge current of the battery 20 may flow in a forward direction. When the charging FET switch is turned on, the charging current may be turned off, while the discharging current is not blocked. The discharging switch may include a discharging FET switch and a second diode. When the discharging FET switch is turned off, the discharging current may be blocked, while the charging current may pass through the second diode to not be blocked.

The battery management unit 120 may include any type of data processing device, such as a processor capable of analyzing the state of the battery 20 and determining whether there is a need to protect the battery 20 based on obtained information of the battery 20, such as a current, voltage, temperature, or the like of the battery 20. As used herein, the term "processor" may mean, for example, a data processing device installed in hardware, having a physically structured circuit for performing a function expressed as a code or a command in a program. Examples of the data processing device installed in a hardware may include a microprocessor, a central processing unit (CPU), a processor core, a multiprocessor, an application-specific integrated circuit (ASIC), and a field programmable gate array (FPGA). However, embodiments are not limited thereto.

The battery management unit 120 may sense at least one of a current, a voltage, and a temperature of the battery 20, and may obtain an amount of remaining power, a lifetime, and a state of charge (SOC) of the battery 20 based on the sensed information. For example, the battery management unit 120 may measure a cell voltage and a cell temperature of the battery cell 21 by using sensors.

The battery management unit 120 may determine an electrical connection state of the battery cells 21 (e.g., whether electrical connection between the battery cells 21 is interrupted, or whether a battery cell 21 is shorted out). If an electrical connection state of a battery cell 21 is abnormal, the battery management unit 120 may block off both the charging current and the discharging current of the battery 20 by turning the discharging FET switch and the charging FET switch in the first switch 130 off.

The protection unit 140 may include a device that may turn itself off if the inner temperature of the battery pack 100 exceeds a preset first threshold value. The protection unit 140 may be a device that may secondarily block off the charging and discharging currents of the battery 20 if the battery management unit 120 malfunctions, even when the battery 20 is exposed to an overcharge and/or an overcurrent but fails to properly open the first switch 130. The first threshold value may be set to a temperature at which a risk of combustion/ignition or explosion from a thermal runway becomes likely. For example, the first threshold value may be set to a temperature of about 90° C. or greater.

The protection unit 140 may include a thermal fuse. The thermal fuse may forcibly interrupt the charging and discharging of the battery 20 by being blown out when a temperature of the thermal fuse is greater than or equal to the first threshold value due to a flowing overcurrent or an internal temperature rise of the battery pack 100. The protection unit 140 may include a self-control protector (SCP) including a fuse, and a heater surrounding the fuse. When the battery 20 is overcharged, the heater of the SCP may be heated to blow out the fuse, thereby blocking an overcharging of the battery 20. That is, when an overcharge and/or overcurrent of the battery 20 are sensed, the protection unit 140 may block off the charging and discharging currents of the battery 20.

The balancing unit 110 may measure a voltage of each battery cell 21 of the battery 20 and may assign each battery cell 21 a corresponding voltage value. The balancing unit 110 may include an active balancing circuit that may balance voltages of the battery cells 21 through power exchange between the battery cells 21, or a passive balancing circuit that may balance voltages of the battery cells 21 through power consumption of the battery cells 21. In some embodiments, the balancing unit 110 may include a passive balancing circuit that may have the battery cells 21 consume their own power.

The balancing unit 110 may include at least one resistor respectively connected to the at least one battery cell 21 in parallel, and at least one switch respectively connected to the resistor(s) in series. The balancing unit 110 may selectively turn on a switch(es) to have the corresponding battery cell(s) 21, which are connected in parallel to the turned on switch, consume their own power, thereby lowering the voltage of the battery cell 21.

In some embodiments, the battery management unit 120 may operate the balancing unit 110 for the purpose of lowering the voltages of the battery cells 21, not for balancing the voltages of the battery cells 21. In this case, the battery management unit 120 may control the balancing unit 110 to turn on all the switches included in the balancing unit 110. For example, when the battery cells 21 are in an overcharging state, the battery management unit 120 may turn on all the switches of the balancing unit 110 to delay or prevent overcharging of the battery 20.

In some embodiments, when the first switch 130 does not normally operate, the battery management unit 120 may discharge the battery cells 21 using the balancing unit 110. When the battery 20 is in an overcharging or overcurrent state, the battery management unit 120 may output a control signal for turning off the first switch. After applying the control signal for turning off the first switch, the battery management unit 120 may sense a current of the battery 20. When the current of the battery 20 is sensed, the battery management unit 120 may operate the balancing unit 110 to self-discharge the battery cells 21. For example, when the battery 20 is in an overcharging state due to a shorting of the first switch 130, a voltage level of the battery cells 21 may exceed an allowable voltage level causing a thermal runaway leading to damage, combustion, or explosion of the battery. In this case, the battery management unit 120 may output a control signal for turning on the switches included in the balancing unit 110, thereby preventing a voltage rise in the battery cells 21 and consequently delaying or avoiding damage, combustion, or explosion of the battery resulting from thermal runaway.

The alert unit 150 may be a device that may send a user an alarm signal in response to the control signal from the battery management unit 120. The alert unit 150 may be at an outer surface of a case of the battery pack 100. However, embodiments are not limited thereto. The alert unit 150 may be arranged at any position that allows the user to notice the alarm signal. The alert unit 150 may include a warning light or a speaker. When the control signal for turning on the alert unit 150 is applied to the alert unit 150 from the battery management unit 120, the alert unit 150 may send the user the alarm signal in the form of a light from the alarm light or sound output through the speaker.

The alert unit 150 may operate when the balancing unit 110 operates as a result of a malfunctioning of the first switch 130. That is, when a failure of the first switch 130 is detected, the battery management unit 120 may sequentially, concurrently, or simultaneously output a control signal for operating the balancing unit 110 and a control signal for operating the alert unit 150.

In some embodiments, the battery pack 100 may further include a self-discharging device that may consume the power of the battery cells 21. For example, in a second protection mode 209, which will be described later with reference to FIG. 2, the battery management unit 120 may operate the balancing unit 110 with control of the self-discharging device to have a maximum output.

In some embodiments, the battery management unit 120 may operate the balancing unit 110 when an overcharging and/or an overcurrent of the battery 20 is sensed while a charger is connected, when the first switch 130 does not normally operate. That is, when a voltage rise of the battery cells 21 is likely or highly likely to occur, the battery management unit 120 may prevent a voltage rise of the battery 20 by operating the balancing unit 110.

Figure 2:
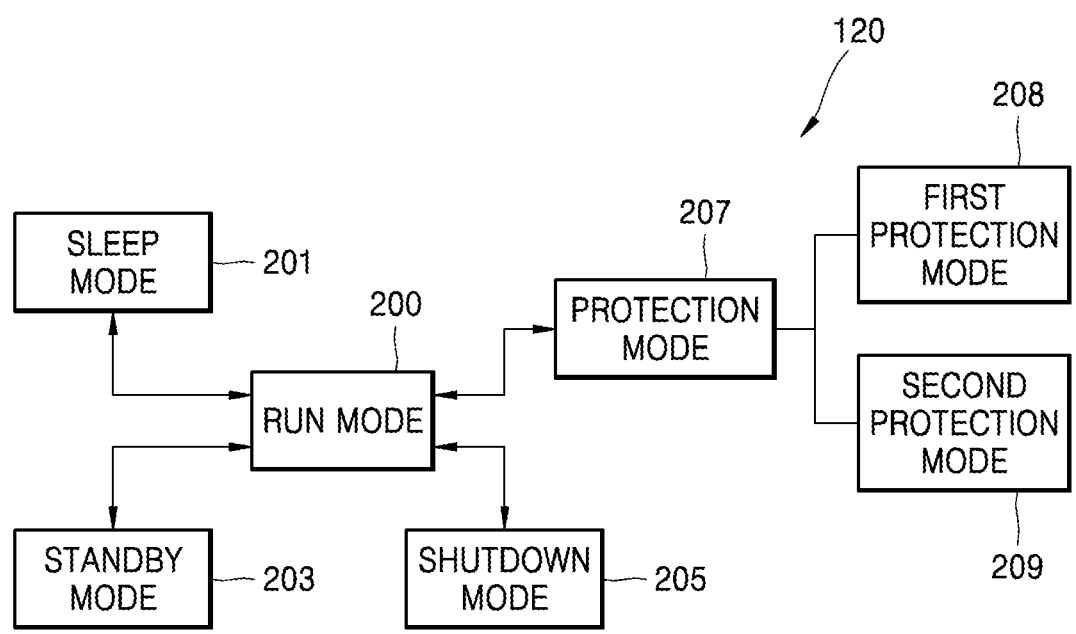
FIG. 2 is a schematic illustration of operation modes of a battery management unit according to an embodiment.

FIG. 2 is a schematic illustration of operation modes of the battery management unit, according to an embodiment.

Referring to FIG. 2, the battery management unit 120 may operate in one of the following modes: for example, a run mode 200, a sleep mode 201, a standby mode 203, a shutdown mode 205, and a protection mode 207.

The run mode 200 may be a mode of operating the battery management unit 120 to analyze a status of the battery 20 by monitoring a current, a temperature, a voltage, and the like of the battery 20. In the run mode 200, the battery management unit 120 may sense a risk of overdischarge, overcharge, overcurrent, overheating, or the like of the battery 20, or an electrical connection trouble in the battery cells 21.

The sleep mode 201 is a mode in which a minimal function of the battery management unit 120 may be maintained to reduce or minimize the power consumption of the battery 20 when a rest state of the battery 20 is maintained (e.g., for a predetermined period of time). In the sleep mode 201, the battery management unit 120 may be switched back to the run mode 200 when a charger or a load is connected so that a run signal is applied thereto.

The standby mode 203 may be a mode in which the battery management unit 120 may prepare for charging or discharging of the battery 20 while the battery 20 is in a rest state. The standby mode 203 may be switched to the sleep mode 201 when the rest state of the battery 20 is maintained for a period of time (e.g., for a predetermined period of time).

The shutdown mode 205 may be a mode in which operation of the battery management unit 120 is interrupted as the operating power of the battery management unit 120 is cut off, or as there is no need to operate the battery management unit 120.

In some embodiments, the battery management unit 120 may have the run mode 200, the protection mode 207, and at least one mode of the sleep mode 201, the standby mode 203, and the shutdown mode 205, wherein operation of the battery management unit 120 in each of the modes may be varied in a different way. The present embodiment is not limited to the above-described operating modes of the battery management unit 120 with respect to the sleep mode 201, the standby mode 203, and the shutdown mode 205.

The protection mode 207 may include a mode in which the battery management unit 120 may temporarily turn off the first switch 130 to protect against a temporary risk of the battery 20 overcharging and/or overdischarging, and a mode in which the battery management unit 120 may permanently turn off the first switch 130 to protect against permanent damage of the battery 20, such as a short circuit between battery cells 21, a malfunction and failure of the first switch 130, overheating of battery 20, or the like.

A first protection mode 208, as the latter one described above, is a mode of turning off the first switch 130 until a battery check-up is completed to avoid or prevent damage of the battery 20.

A second protection mode 209 is a mode for protecting the battery 20 when the first switch 130 is turned off (for example, due to an electrical short/shorting out of the first switch 130) even after the battery management unit 120 applies a control signal for turning off the first switch 130 in the first protection mode 208. In the second protection mode 209, the battery management unit 120 may operate the balancing unit 110. The battery management unit 120 may turn on the switches in the balancing unit 110 to allow the resistors of the balancing unit 110 consume the power of the battery cells 21. Due to the power consumption by the resistors, the voltage of the battery cells 21 or a voltage rise rate of the battery cells 21 may be reduced. The second protection mode 209 does not work when overdischarging of the battery 20 is not sensed.

In some embodiments, the battery management unit 120 may operate in the second protection mode 209 when a voltage of the battery cell 21 still continues to rise while a charger is connected to the battery pack 100 even after charging is completed. For example, the battery management unit 120 may apply a control signal to turn off the first switch 130 after the battery 20 is completely charged. However, the first switch 130 may erroneously remain on if the first switch 130 fails or malfunctions. In this case, the battery management unit 120 may select the second protection mode 209 as an operation mode to operate the balancing unit 110, thereby delaying or avoiding the overcharge of the battery 20.

When the battery 20 is overcharged, the protection unit 140 may disconnect the electrical connection between the battery 20 and the charger. However, due to a slow response rate of the protection unit 140, there may be an increased risk of combustion and/or explosion of the battery 20 due to a thermal runaway of the battery 20 before the electrical connection is interrupted. In this case, the battery management unit 120 may delay or prevent combustion and/or explosion of the battery 20 caused from a thermal runaway of the battery by operating the balancing unit 110 before operation of a protection unit 140.

In some embodiments, the battery management unit 120 may increase a power consumption rate of the battery 20 in the second protection mode 209. The battery management unit 120 may operate with the power supplied from the battery 20. In the second protection mode 209, the battery management unit 120 may increase a power consumption level to a maximum level while operating the balancing unit 110. This may delay or prevent combustion and/or explosion of the battery 20 otherwise caused from a thermal runaway of the battery 20 before operation of the protection unit 140.

Figure 3:
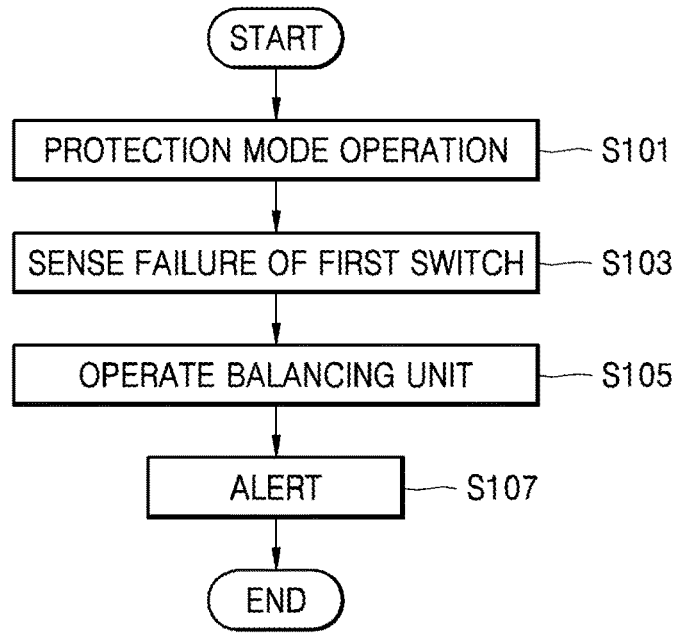
FIG. 3 is a flowchart of a method of protecting a battery pack, according to an embodiment.

FIG. 3 is a flowchart of a method of protecting a battery pack, according to an embodiment.

The flowchart of FIG. 3 may include the operations of protecting a battery pack 100 according to an embodiment described above with reference to FIG. 1 in a time series sequence. The above detailed description of the elements of FIG. 1 may also apply to the flowchart of FIG. 3.

Referring to FIG. 3, when overcharging, overcurrent, or abnormal electrical connection between the battery cells 21 is sensed, the battery pack 100 may start the protection mode 207 to protect the battery 20. In the protection mode 207, the battery pack 100 may output a control signal for turning off the first switch 130 (S101).

When a current signal of the battery 20 is still sensed after the control signal is output, the battery pack 100 may determine that there is a failure due to, for example, a shorting of the first switch 130. When a failure of the first switch 130 is sensed, the battery pack 100 may start the second protection mode 209 (S103).

In the second protection mode 209, the battery pack 100 may operate the balancing unit 110 to allow the resistors of the balancing unit 110 to consume the power of the battery cell 21, thereby lowering a voltage rise rate of the battery cells 21 and consequently delaying or avoiding combustion and/or explosion otherwise caused from a thermal runaway of the battery 20 (S105).

In the second protection mode 209, the battery pack 100 may also externally alert a failure of the first switch 130 and a corresponding risk of combustion and/or explosion of the battery 20. The battery pack 100 may alert the risk as sound through a speaker installed in the alert unit 150 or as a visual signal (e.g., with an LED lamp) (S107).

Figure 4:
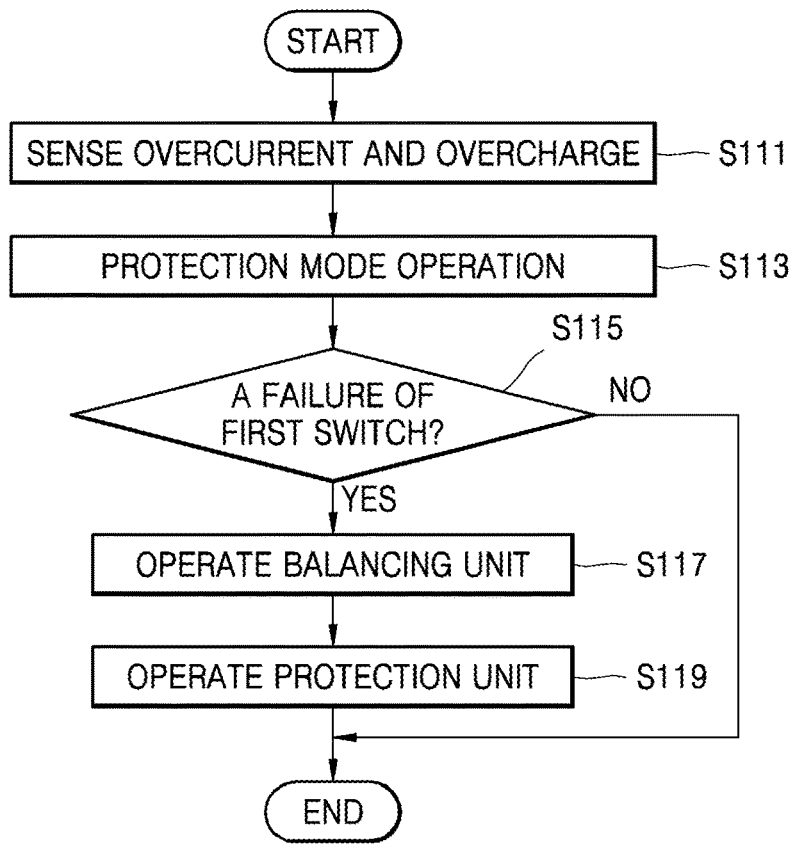
FIG. 4 is a flowchart of a method of protecting a battery pack, according to another embodiment.

FIG. 4 is a flowchart of a method of protecting a battery pack, according to another embodiment.

The flowchart of FIG. 4 may include the operations of protecting a battery pack 100 according to an embodiment described above with reference to FIG. 1 in a time series sequence. The above detailed description of the elements of FIG. 1 may also apply to the flowchart of FIG. 4.

Referring to FIG. 4, the battery pack 100 may sense at least one of an overcurrent and overcharging of the battery 20. When an overcurrent and/or overcharging of the battery 20 is sensed, the battery pack 100 may start the protection mode 207 (S111).

The battery pack 100 may output a control signal for turning off the first switch 130 to protect the battery 20 from overcharging and from an overcurrent (S113).

The battery pack 100 may sense whether the first switch 130 has properly operated to disconnect the electrical connection between the battery 20 and an external device (S115).

When the first switch 130 is not properly turned off due to, for example, an electrical short, the battery pack 100 may switch to the second protection mode 209. In the second protection mode 209, the battery pack 100 may operate the balancing unit 110. When the balancing unit 110 is operated, the resistors of the balancing unit 110 may consume the power of the battery cells 21, thereby delaying a voltage rise rate of the battery cells 21 and/or reducing a level of the overcurrent. That is, in the second protection mode 209, the battery pack 100 may delay or avoid combustion and/or explosion otherwise caused from a thermal runaway of the battery cells 21 by operating the balancing unit 110 (S117).

Next, the battery pack 100 may be disconnected from the external device by operating the protection unit 140 included in the battery pack 100 (S119). For example, the fuse may be blown out when heat generated by an overcurrent and overcharging is applied to the fuse. Accordingly, it may take time until the fuse starts to operate. This may delay blocking the electrical connection between the battery 20 and an external deice (e.g., a charger), thereby raising a risk of combustion and/or explosion caused by a thermal runaway of the battery cells 21. However, the battery pack 100 according to an embodiment, as described above, may prevent a voltage rise in the battery cells 21 even when the first switch 130 does not property operate by operating the balancing unit 110, thus delaying or preventing combustion and/or explosion otherwise caused by a thermal runaway of the battery cells 21. That is, the battery pack 100 may improve or secure the time it may take until the protection unit 140, which includes such a fuse, operates by operating the balancing unit 110.

It should be understood that embodiments described herein should be considered in a descriptive sense only, and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A battery pack comprising:
 a battery comprising battery cells;
 a balancing unit for balancing voltages between the battery cells;
 a first switch on a high-current path of the battery; and
 a battery management unit for monitoring a voltage, a temperature, and a current of the battery, for applying a control signal for turning off the first switch, for sensing whether the first switch has properly operated to disconnect an electrical connection between the battery and an external device after receiving the control signal, and for operating the balancing unit when the first switch is not turned off in response to the control signal despite the control signal having been applied, the balancing unit being configured to balance voltages between the battery cells independently of the battery management unit otherwise.

2. The battery pack of claim 1, further comprising a protection unit on the high-current path of the battery for blocking the high-current path when the temperature of the battery exceeds a first threshold value.

3. The battery pack of claim 2, wherein the protection unit is for blocking the high-current path after operation of the balancing unit.

4. The battery pack of claim 2, wherein the protection unit comprises at least one of a fuse that is blown out when the temperature reaches the first threshold value, and a self-control protector (SCP).

5. The battery pack of claim 1, wherein the battery management unit is for operating the balancing unit when the battery is in an overcharging state.

6. The battery pack of claim 1, wherein the balancing unit is for balancing a voltage by self-discharging of the battery cells.

7. The battery pack of claim 1, further comprising an alert unit for generating an alarm signal when the balancing unit operates as the first switch is not turned off in response to the control signal.

8. The battery pack of claim 1, wherein the battery management unit is configured to operate the balancing unit when the first switch is not turned off in response to the control signal despite the control signal having been applied by turning on switches of the balancing unit to allow resistors of the balancing unit to consume power.

9. A method of protecting a battery pack, the method comprising:
 sensing at least one of an overcharging or an overcurrent of a battery of the battery back;
 outputting a control signal for turning off a first switch on a high-current path of the battery;
 sensing whether the first switch has properly operated to disconnect an electrical connection between the battery and an external device after receiving the control signal; and
 operating a balancing unit under control of a battery management unit to balance a voltage of at least one battery cell of the battery when the first switch is not turned off in response to the control signal despite the control signal having been applied, and balancing the voltage of the at least one battery cell of the battery with the balancing unit independently of the battery management unit otherwise.

10. The method of claim 9, further comprising operating a protection unit to block the high-current path when a temperature of the battery exceeds a first threshold value due to an overcharge or an overcurrent of the battery.

11. The method of claim 10, wherein the protection unit comprises at least one of a fuse that is blown out when the temperature reaches the first threshold value, and a self-control protector (SCP).

12. The method of claim 9, further comprising generating an alarm signal after the balancing unit is operated as the first switch is not turned off in response to the control signal.

13. The method of claim 9, wherein operating the balancing unit under control of the battery management unit comprises turning on switches of the balancing unit to allow resistors of the balancing unit to consume power.

* * * * *